US009500870B2

(12) United States Patent
Zuo et al.

(10) Patent No.: US 9,500,870 B2
(45) Date of Patent: Nov. 22, 2016

(54) BEAM SPLITTING SYSTEM FOR LASER RANGING

(71) Applicant: JINHUA LANHAI PHOTOELECTRICITY TECHNOLOGY CO., LTD., Zhejiang (CN)

(72) Inventors: Luo Zuo, Zhejiang (CN); Xiangwei Qian, Zhejiang (CN)

(73) Assignee: JINHUA LANHAI PHOTOELECTRICITY TECHNOLOGY CO., LTD, Zhejiang (CN)

(*) Notice: Subject to any disclaimer, the term of this patent is extended or adjusted under 35 U.S.C. 154(b) by 149 days.

(21) Appl. No.: 14/539,414

(22) Filed: Nov. 12, 2014

(65) Prior Publication Data

US 2015/0370077 A1    Dec. 24, 2015

(30) Foreign Application Priority Data

Jun. 24, 2014    (CN) .......................... 2014 1 0285655

(51) Int. Cl.
| G02B 27/14 | (2006.01) |
| G01C 3/02 | (2006.01) |
| G02B 5/04 | (2006.01) |
| G02B 27/12 | (2006.01) |

(52) U.S. Cl.
CPC ........... *G02B 27/145* (2013.01); *G02B 27/126* (2013.01); *G01C 3/02* (2013.01)

(58) Field of Classification Search
CPC .............. G02B 27/126; G02B 27/145; G02B 27/14–27/149; G01C 3/02
USPC ...... 359/638, 639, 629, 583, 489.07, 489.08
See application file for complete search history.

(56) References Cited

U.S. PATENT DOCUMENTS

| 2,398,027 A * | 4/1946 | Mihalyi ................... G01C 3/02 356/19 |
| 2002/0057496 A1* | 5/2002 | Kanai ................ G02B 23/2453 359/625 |

* cited by examiner

*Primary Examiner* — Zachary Wilkes
*Assistant Examiner* — George G King
(74) *Attorney, Agent, or Firm* — Hamre, Schumann, Mueller & Larson, P.C.

(57) ABSTRACT

A beam splitting system for laser ranging includes a roof half-pentaprism, an isosceles prism and a compensating prism. Due to different compensating prisms, there are four light splitting combinations in total. Light of a certain wavelength is incident from one side of the roof half-pentaprism, and is reflected therein for several times and finally emergent into the isosceles prism where it is reflected for several times and finally emergent in a direction consistent with an incident light axis. Light of another wavelength is incident from one side of the compensating prism, and finally emergent from one side of the roof half-pentaprism or one side of the isosceles prism. Different light splitting ways may be caused due to different positions of both prisms and data LCDs. A number of different optical ranging systems will be provided if a laser rangefinder employs different light splitting combinations.

10 Claims, 8 Drawing Sheets

BEAM SPLITTING SYSTEM FOR LASER RANGING

TECHNICAL FIELD

The present invention relates to the technical field of beam splitting, and particularly to a beam splitting system for laser ranging.

BACKGROUND OF THE INVENTION

At present, optical beam splitters of laser rangefinders are complicated in structure, large in size, difficult in installation and debugging, difficult in controlling a beam splitting and propagation path, and low in stability.

SUMMARY OF THE INVENTION

To overcome the deficiencies of the optical beam splitter of an existing laser rangefinder, such as complicated structure, large size, high difficulty in installation and debugging and low stability, the present invention provides a beam splitting system for laser ranging, with simple and compact structure, small size, easy installation and debugging, good stability and high measurement precision.

To achieve the above object, the present invention employs the following technical solutions.

A beam splitting system for laser ranging is provided, including a roof half-pentaprism, an isosceles prism and a compensating prism; the roof half-pentaprism includes a roof transceiving surface, an outer roof reflecting surface, an inner roof reflecting surface and a top roof surface, two ends of the roof transceiving surface being intersected with one end of the outer roof reflecting surface and one end of the inner roof reflecting surface, respectively, two ends of the top roof surface being intersected with the other end of the outer roof reflecting surface and the other end of the inner roof reflecting surface, respectively, an included angle between the outer roof reflecting surface and the roof transceiving surface being 112.5°, an included angle between the roof transceiving surface and the inner roof reflecting surface being 45°, an included angle between the inner roof reflecting surface and the top roof surface being 90°; two isosceles surfaces of the isosceles prism are an isosceles surface I and an isosceles surface II, respectively, the bottom surface of the isosceles prism being a bottom isosceles surface, an included angle between the isosceles surface I and the isosceles surface II being 45°; the isosceles surface I of the isosceles prism is parallel to the inner roof reflecting surface of the roof half-pentaprism, and a space between the isosceles surface I and the inner roof reflecting surface is 0.8-1 mm; the compensating prism is a compensating prism I, a compensating prism II, a compensating prism III or a compensating prism IV; (I) when the compensating prism is a compensating prism I, the compensating prism I includes a compensation transceiving surface I and a compensation gluing surface I, an included angle between the compensation transceiving surface I and the compensation gluing surface I being 22.5°, the compensation gluing surface I of the compensating prism I being connected to the bottom isosceles surface of the isosceles prism by means of gluing connection, an included angle between the compensation transceiving surface I and the isosceles surface I being 90°; (II) when the compensating prism is a compensating prism II, the compensating prism II includes a first compensation transceiving surface II, a second compensation transceiving surface II and a compensation gluing surface II, an included angle between the first compensation transceiving surface II and the compensation gluing surface II being 22.5°, an included angle between the second compensation transceiving surface II and the compensation gluing surface II being 22.5°, an included angle between the first compensation transceiving surface II and the second compensation transceiving surface II being 135°, the compensation gluing surface II of the compensating prism II being connected to the bottom isosceles surface of the isosceles prism by means of gluing connection, an included angle between the first compensation transceiving surface II and the isosceles surface I being 90°; (III) when the compensating prism is a compensating prism III, the compensating prism III includes a first compensation transceiving surface III, a second compensation transceiving surface III, a compensation reflecting surface III and a compensation gluing surface III, an included angle between the first compensation transceiving surface III and the compensation gluing surface III being 112.5°, an included angle between the first compensation transceiving surface III and the second compensation transceiving surface III being 90°, an included angle between the second compensation transceiving surface III and the compensation reflecting surface III being 112.5°, an included angle between the second compensation transceiving surface III and the compensation gluing surface III being 22.5°, an included angle between the compensation reflecting surface III and the compensation gluing surface III being 45°, the compensation gluing surface III of the compensating prism III being connected to the bottom isosceles surface of the isosceles prism by means of gluing connection, an included angle between the first compensation transceiving surface III and the isosceles surface I being 45°; and, (IV) when the compensating prism is a compensating prism IV, the compensating prism IV includes a compensation transceiving surface IV, a compensation reflecting surface IV and a compensation gluing surface IV, an included angle between the compensation transceiving surface IV and the compensation gluing surface IV being 112.5°, an included angle between the compensation transceiving surface IV and the compensation reflecting surface IV being 45°, an included angle between the compensation reflecting surface IV and the compensation gluing surface IV being 22.5°, the compensation gluing surface IV of the compensating prism IV being connected to the bottom isosceles surface of the isosceles prism by means of gluing connection, an included angle between the compensation transceiving surface IV and the isosceles surface I being 45°.

There are four types of compensating prisms in this solution, and the compensation gluing surface of each compensating prism is in gluing connection to the bottom isosceles surface of the isosceles prism, so there are four different combinations of optical beam splitters. The connection of the roof half-pentaprism and the isosceles prism is a common connection way for the four different combinations of optical beam splitters. Due to different compensating prism, the light splitting ways are different. An optional beam splitter in each light splitting way may be used as an optical splitter of one set of laser rangefinder, so that four sets of laser rangefinders having different light splitting ways of optional beam splitters may be manufactured for use in different occasions, thereby enlarging the application range and improving the measurement precision of a laser rangefinder. In this solution, if a light beam emitted from an emitter is incident into an optical beam splitter from the roof transceiving surface of the roof half-pentaprism, the light beam will be vertically incident into the isosceles prism after reflected by the inner roof reflecting surface and the outer roof reflecting surface in turn, and is then emergent from the optical beam splitter in a direction vertical to the isosceles surface II after reflected by the isosceles surface II, the bottom isosceles surface and the isosceles surface I in turn. If a light beam emitted from an emitter is incident into an optical beam splitter from the compensating prism, the propagation of a part of the split light beam is as follows: if the propagation path of this part of light beam in the isosceles prism and the roof half-pentaprism is the same as the propagation path of a light beam incident into the optical beam splitter from the roof transceiving surface but opposite to the propagation direction thereof, the light beam is finally emergent from the optical beam splitter in a direction vertical to the roof transceiving surface of the roof half-pentaprism; the propagation of another part of the split light beam is as follows: if this part of light beam is propagated in the isosceles prism only, after reflected by the isosceles surface I of the isosceles prism, this part of light beam is vertically emergent from the isosceles surface II, along an emergent and propagation path, in the isosceles prism, of the light beam incident into the optical beam splitter from the roof transceiving surface. This solution has simple and compact structure, small size, various types of light splitting, wide measurement range, easy installation and debugging, good stability and high measurement precision.

Preferably, an isosceles cutting surface is provided on the isosceles prism, and two ends of the isosceles cutting surface are intersected with one end of the isosceles surface II and one end of the bottom isosceles surface, respectively; and, an included angle between the isosceles surface II and the isosceles cutting surface is 135°. A part of the isosceles prism without influencing the beam splitting is cut off by the isosceles cutting surface, so that the size of an optical beam splitter is reduced and the space of a laser rangefinder may be effectively saved. The included angle between the isosceles surface II and the isosceles cutting surface is 135°, so that the isosceles cutting surface is allowed to be parallel to the isosceles surface I. Such a structure has high stability, easy installation and debugging, compact structure and small size.

Preferably, the section of the compensating prism I is a triangle, and the compensating prism I having a triangular section includes a compensation cutting surface I, an included angle between the compensation transceiving surface I and the compensation cutting surface I being 90°. Such a structure is simple, so that the compensation cutting surface is allowed to parallel to the isosceles surface I. Such a structure has high stability and easy installation and debugging. The compensation cutting surface I reduces the size of the optical beam splitter, lowers the influences of a transparent object on the cutting surface to the light beam, and has high stability and reliability, compact structure and small size.

Preferably, the section of the compensating prism II is a pentagon, the compensating prism II having a pentagonal section including a first compensation cutting surface II and a second compensation cutting surface II, an included angle between the first compensation cutting surface II and the compensation gluing surface II being 112.5°, an included angle between the first compensation cutting surface II and the first compensation transceiving surface II being 90°, two ends of the first compensation cutting surface II being intersected with one end of the compensation gluing surface II and one end of the first compensation transceiving surface II, respectively, an included angle between the second compensation cutting surface II and the compensation gluing surface II being 112.5°, an included angle between the second compensation cutting surface II and the second compensation transceiving surface II being 90°, two ends of the second compensation cutting surface II being intersected with the other end of the compensation gluing surface II and one end of the second compensation transceiving surface II, respectively. The first compensation cutting surface II and the second compensation cutting surface II reduce the size of the optical beam splitter, lower the influences of a transparent object on the cutting surface to the light beam, and have high stability and reliability, compact structure and small size.

Preferably, the section of the compensating prism III is a pentagon, the compensating prism III having a pentagonal section including a compensation cutting surface III, an included angle between the compensation cutting surface III and the compensation gluing surface III being 112.5°, an included angle between the compensation cutting surface III and the compensation reflecting surface III being 112.5°, two ends of the compensation cutting surface III being intersected with one end of the compensation gluing surface III and one end of the compensation reflecting surface III, respectively. The compensation cutting surface III reduces the size of the optical beam splitter, lowers the influences of a transparent object on the cutting surface onto the light beam, and has high stability and reliability, compact structure and small size.

Preferably, the section of the compensating prism IV is a pentagon, the compensating prism IV having a pentagonal section including a first compensation cutting surface IV and a second compensation cutting surface IV, an included angle between the first compensation cutting surface IV and the compensation transceiving surface IV being 90°, an included angle between the first compensation cutting surface IV and the compensation reflecting surface IV being 135°, two ends of the first compensation cutting surface IV being intersected with one end of the compensation transceiving surface IV and one end of the compensation reflecting surface IV, respectively, an included angle between the second compensation cutting surface IV and the compensation gluing surface IV being 112.5°, an included angle between the second compensation cutting surface IV and the compensation reflecting surface IV being 90°, two ends of the second compensation cutting surface IV being intersected with the other end of the compensation gluing surface II and the other end of the compensation reflecting surface IV, respectively. The first compensation cutting surface IV and the second compensation cutting surface IV reduce the size of an optical beam splitter, lower the influences of a transparent object on the cutting surface onto the light beam, and have high stability and reliability, compact structure and small size.

Preferably, the compensation cutting surface I and the isosceles cutting surface are in a same plane, and one end of the compensation transceiving surface I, one end of the compensation gluing surface I and one end of the isosceles surface I are intersected on a same straight line. This structure is compact, the size is small, and the stability is high.

Preferably, the first compensation cutting surface II and the isosceles surface I are in a same plane, and the other end of the compensation gluing surface II, one end of the second compensation cutting surface II and one end of the isosceles cutting surface are intersected on a same straight line. This structure is compact, the size is small, and the stability is high.

Preferably, the compensation cutting surface III and the isosceles surface I are in a same plane, and the other end of the compensation gluing surface III, one end of the first compensation transceiving surface III and one end of the isosceles cutting surface are intersected on a same straight line. This structure is compact, the size is small, and the stability is high.

Preferably, the second compensation cutting surface IV and the isosceles surface I are in a same plane, and one end of the compensation gluing surface IV, the other end of the compensation transceiving surface IV and one end of the isosceles cutting surface are intersected on a same straight line. This structure is compact, the size is small, and the stability is high.

The present invention may have the following effects: the present invention has the advantages of simple and compact structure, small size, various types of light splitting, wide measurement range, easy installation and debugging, good stability and high measurement precision.

DETAILED DESCRIPTION OF THE INVENTION

Figure 1:
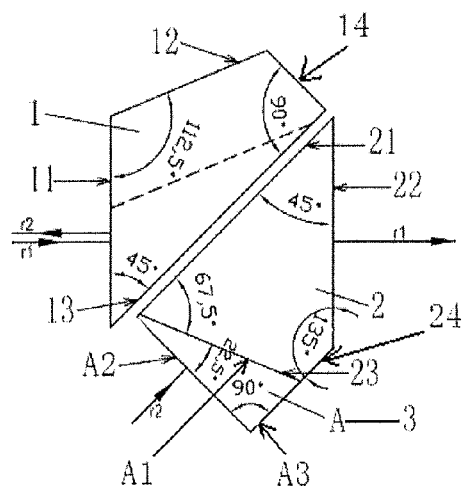
FIG. 1 is a connection structure diagram when the compensating prism of an optical beam splitter is a compensating prism I according to Embodiment 1 or Embodiment 2 of the present invention.

The technical solutions of the present invention will be further described as below with reference to drawings by embodiments.

Embodiment 1: A beam splitting system for laser ranging is provided, referring to FIGS. 1, 2 and 3, including: a roof half-pentaprism (1), an isosceles prism (2) and a compensating prism (3), where the compensating prism is a compensating prism I (A).

The roof half-pentaprism includes a roof transceiving surface (11), an outer roof reflecting surface (12), an inner roof reflecting surface (13) and a top roof surface (14). Two ends of the roof transceiving surface are intersected with one end of the outer roof reflecting surface and one end of the inner roof reflecting surface, respectively. Two ends of the top roof surface are intersected with the other end of the outer roof reflecting surface and the other end of the inner roof reflecting surface, respectively. An included angle between the outer roof reflecting surface and the roof transceiving surface is 112.5°. An included angle between the roof transceiving surface and the inner roof reflecting surface is 45°. An included angle between the inner roof reflecting surface and the top roof surface is 90°.

Two isosceles surfaces of the isosceles prism are an isosceles surface I (21) and an isosceles surface II (22), respectively. The bottom surface of the isosceles prism is a bottom isosceles surface (23). An included angle between the isosceles surface I and the isosceles surface II is 45°. An isosceles cutting surface (24) is provided on the isosceles prism. Two ends of the isosceles cutting surface are intersected with one end of the isosceles surface II and one end of the bottom isosceles surface, respectively. An included angle between the isosceles surface II and the isosceles cutting surface is 135°. The isosceles surface I of the isosceles prism is parallel to the inner roof reflecting surface of the roof half-pentaprism, and a space between the isosceles surface I and the inner roof reflecting surface is 0.8-1 mm.

When the compensating prism (3) of an optical beam splitter (100) is a compensating prism I (A), the section of the compensating prism I is a triangle. The compensating prism I having a triangular section includes a compensation cutting surface I (A3), a compensation transceiving surface I (A2) and a compensation gluing surface I (A1). An included angle between the compensation transceiving surface I and the compensation gluing surface I is 22.5°. An included angle between the compensation transceiving surface I and the compensation cutting surface I is 90°. The compensation gluing surface I of the compensating prism I is connected to the bottom isosceles surface of the isosceles prism by means of gluing connection. An included angle between the compensation transceiving surface I and the isosceles surface I is 90°. The compensation cutting surface I and the isosceles cutting surface are in a same plane. One end of the compensation transceiving surface I, one end of the compensation gluing surface I and one end of the isosceles surface I are intersected on a same straight line.

Figure 2:
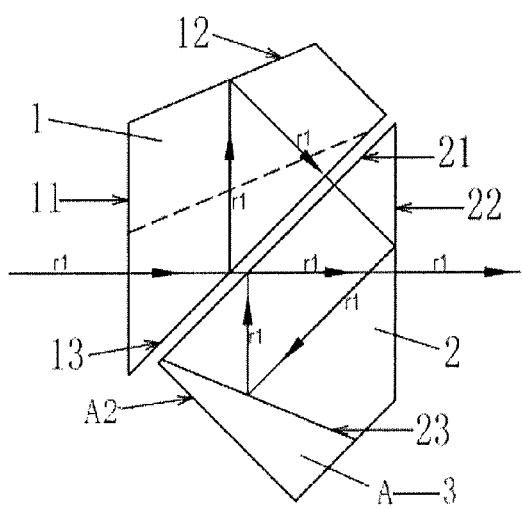
FIG. 2 is a schematic diagram of a light propagation path of a light beam r1 in an optical beam splitter after being incident to the optical beam splitter from a roof transceiving surface of a roof half-pentaprism, when the compensating prism of the optical beam splitter is a compensating prism I according to Embodiment 1 or Embodiment 2 of the present invention.

Referring to FIG. 2, the propagation path of a light beam r1 in an optical beam splitter (100) is as follows: the light beam r1 is incident into the roof half-pentaprism from the roof transceiving surface, then vertically emergent into the isosceles prism after reflected by the inner roof reflecting surface and the outer roof reflecting surface in turn, and finally vertically emergent from the isosceles surface II after reflected by the isosceles surface II, the bottom isosceles surface and the isosceles surface I in turn.

Figure 3:
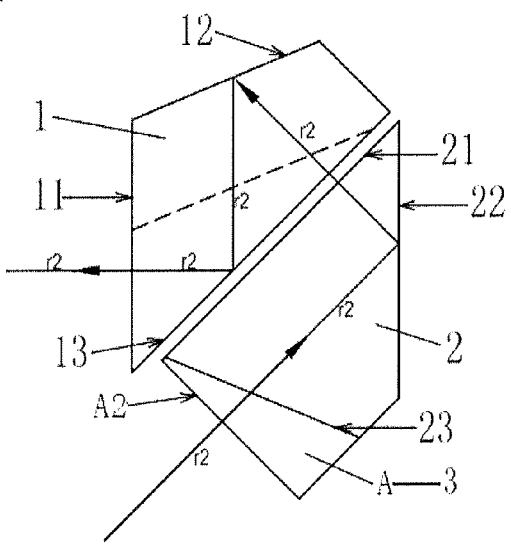
FIG. 3 is a schematic diagram of a light propagation path of a light beam r2 in an optical beam splitter after being incident to the optical beam splitter from a compensation transceiving surface I of a compensating prism I, when the compensating prism of the optical beam splitter is the compensating prism I according to Embodiment 1 or Embodiment 2 of the present invention.

Referring to FIG. 3, the propagation path of a light beam r2 in an optical beam splitter (100) is as follows: the light beam r2 is vertically incident into the compensating prism I from the compensation transceiving surface I of the compensating prism I, then incident into the isosceles prism after passing through the compensation gluing surface I and the bottom isosceles surface, vertically incident into the roof half-pentaprism after reflected by the isosceles surface II in the isosceles prism, and finally vertically emergent from the roof transceiving surface after reflected in the roof half-pentaprism by the outer roof reflecting surface and the inner roof reflecting surface.

Figure 4:
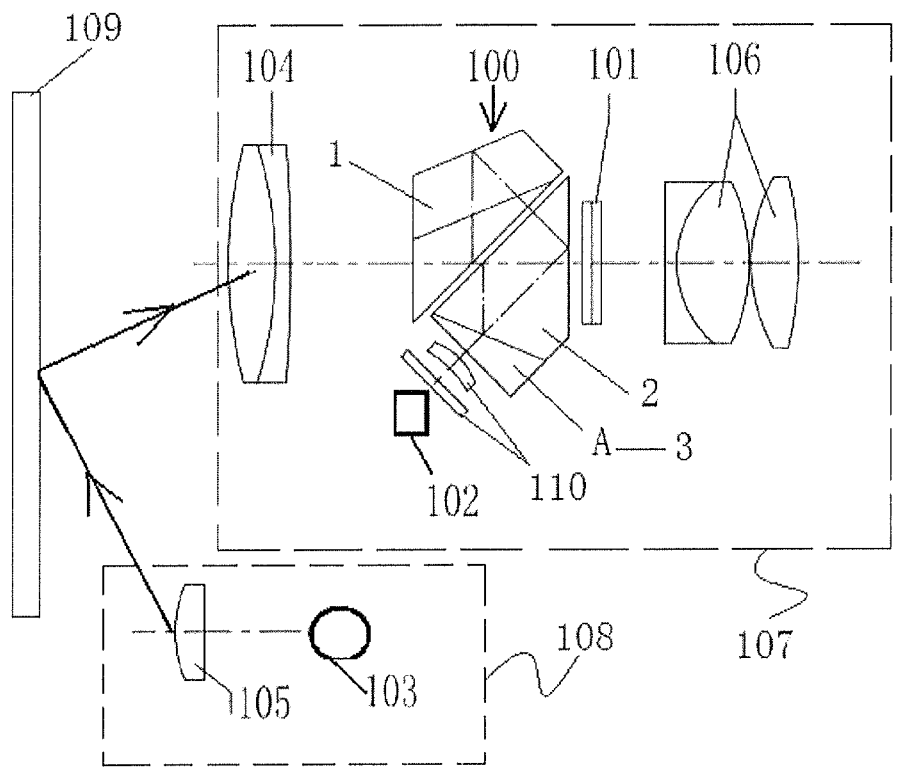
FIG. 4 is a connection structure diagram in a use state of an assembled laser rangefinder where laser is emitted by a transceiving system II and received by a transceiving system I, when the compensating prism of an optical beam splitter is a compensating prism I according to Embodiment 1 of the present invention.

During installation, referring to FIGS. 1 and 4, when a laser rangefinder is assembled with an optional beam splitter (100) having the compensating prism I (A), the laser rangefinder includes a transceiving system I (107) and a transceiving system II (108). The transceiving system I includes an objective lens (104), an optional beam splitter (100), an LCD (101), a receiver (102) and an ocular lens (106). The transceiving system II includes a transceiving lens (105) and an emitter (103). The objective lens (104) is disposed on one side opposite to the roof transceiving surface (11) of the roof half-pentaprism (1) of the optional beam splitter (100). The ocular lens (106) is disposed on one side opposite to the isosceles surface II (22) of the isosceles prism (2) of the optional beam splitter (100). The LCD (101) is disposed between the ocular lens (106) and the isosceles surface II (22) of the isosceles prism (2). The receiver (102) is disposed on one side opposite to the compensation transceiving surface I of the compensating prism I of the optional beam splitter (100). A combined lens (110) is disposed between the receiver (102) and the compensation transceiving surface I of the compensating prism I.

When in measurement, referring to FIG. 4, a reflecting target may be mounted on a target object to be measured. The reflecting target has good reflection effect, and can accurately obtain an actual distance from a measurement place to an actual measurement point on the target object to be measured. In this way, the measured data is highly accurate.

During measurement, referring to FIG. 4, laser is emitted by the transceiving system II (108) and then received by the transceiving system I (107). In Embodiment 1, an infrared beam emitted from the emitter (103) is incident to the reflecting target (109) on a target object to be measured via the transceiving lens (105). A part of infrared beam, reflected by the reflecting target on the target object to be measured, is incident into the objective lens. In regard of this part of infrared beam incident into the objective lens, referring to FIG. 2, a part will be propagated along the propagation path of the light beam r1 in the optical beam splitter (100) and then emergent from the isosceles surface II so as to display an optical image on the LCD, a user may thus clearly view the reflecting target on the target object to be measured through the ocular lens; and referring to FIG. 3, the other part will be propagated along a reverse propagation path of the light beam r2 in the optical beam splitter (100), then emergent from the compensation transceiving surface I (A2) of the compensating prism I, and finally received by the receiver (102) after passing through the combined lens (110). According to the round-trip time and light velocity of an infrared beam from a laser rangefinder, a distance from the laser rangefinder to the reflecting target on the target object to be measured may be measured, and the data of the measured distance is displayed on the LCD. The beam splitting system for laser ranging provided by Embodiment 1 has simple and compact structure, convenient use, good stability and high measurement precision.

Figure 5:
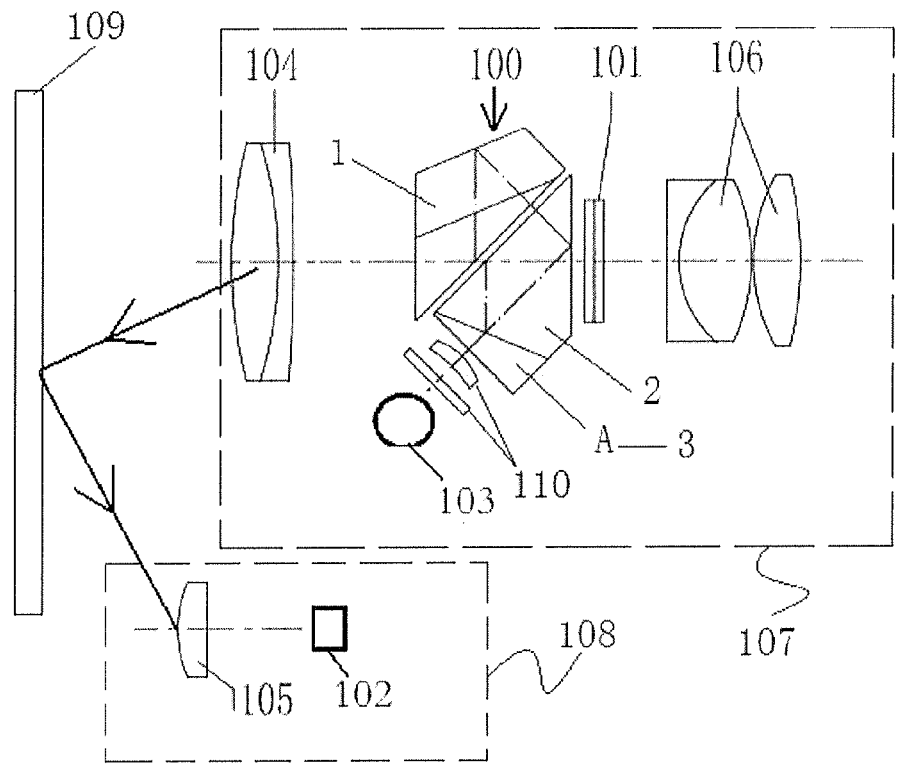
FIG. 5 is a connection structure diagram in a use state of an assembled laser rangefinder where laser is emitted by a transceiving system I and received by a transceiving system II, when the compensating prism of an optical beam splitter is a compensating prism I according to Embodiment 2 of the present invention.

Embodiment 2: Referring to FIG. 5, during installation, the difference between FIG. 5 and FIG. 4 lies in that the receiver (102) in the transceiving system I (107) in FIG. 4 is replaced with an emitter (103), and the emitter (103) in the transceiving system II (108) in FIG. 4 is replaced with a receiver (102). Other structures of FIG. 5 are the same as those of FIG. 4. In Embodiment 2, when in use, laser is emitted by the transceiving system I (107) and then received by the transceiving system II (108). Referring to FIGS. 1, 2 and 3, the propagation direction of the laser beam in Embodiment 2 is opposite to the propagation direction of the laser beam in Embodiment 1. The working principle of Embodiment 2 is the same as the working principle of Embodiment 1. The specific installation and working processes refer to Embodiment 1.

Figure 10:
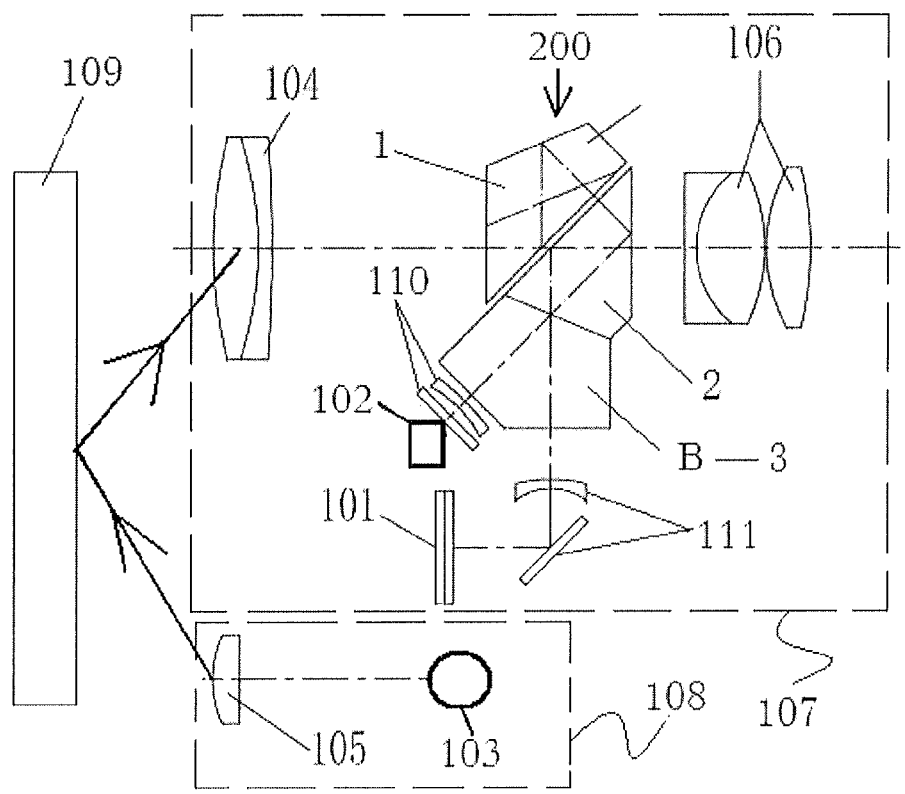
FIG. 10 is a connection structure diagram in a use state of an assembled laser rangefinder where laser is emitted by a transceiving system II and received by a transceiving system I, when the compensating prism of an optical beam splitter is a compensating prism II according to Embodiment 3 of the present invention.

Embodiment 3: Referring to FIG. 10, the difference between FIG. 10 and FIG. 4 lies in that: first, the optical beam splitter (100) in the transceiving system I (107) in FIG. 4 is replaced with an optical beam splitter (200), the compensating prism (3) of the optical beam splitter (200) is a compensating prism II (B), and the compensating prism II includes a first compensation transceiving surface II (B3) and a second compensation transceiving surface II (B4); second, the combined lens (110) and the receiver (102) are disposed on one side opposite to the first compensation transceiving surface II of the compensating prism II (B), and the combined lens (110) is disposed between the first compensation transceiving surface II (B3) and the receiver (102); and third, a group of combined reflecting lens (111) are disposed on one side opposite to the second compensation transceiving surface II of the compensating prism II (B), and the LCD (101) is disposed in front of the reflecting surfaces of the combined reflecting lens. Other connection structures of FIG. 10 are the same as those of FIG. 4.

Figure 6:
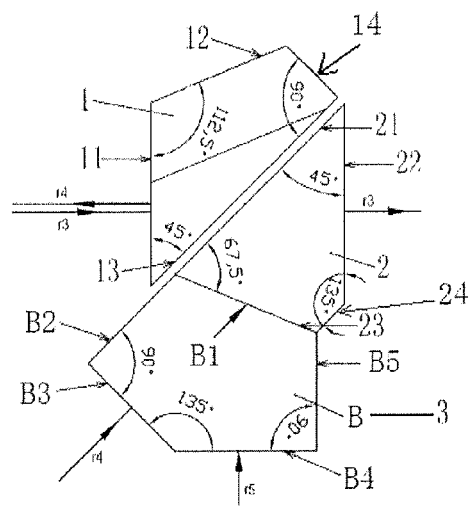
FIG. 6 is a connection structure diagram when the compensating prism of an optical beam splitter is a compensating prism II according to Embodiment 3 or Embodiment 4 of the present invention.

Referring to FIG. 6, when the compensating prism (3) is a compensating prism II (B), the section of the compensating prism II is a pentagon. The compensating prism II having a pentagonal section includes a first compensation cutting surface II (B2), a second compensation cutting surface II (B5), a first compensation transceiving surface II (B3), a second compensation transceiving surface II (B4) and a compensation gluing surface II (B1). An included angle between the first compensation transceiving surface II and the compensation gluing surface II is 22.5°. An included angle between the second compensation transceiving surface II and the compensation gluing surface II is 22.5°. An included angle between the first compensation transceiving surface II and the second compensation transceiving surface II is 135°. An included angle between the first compensation cutting surface II and the compensation gluing surface II is 112.5°. An included angle between the first compensation cutting surface II and the first compensation transceiving surface II is 90°. Two ends of the first compensation cutting surface II are intersected with one end of the compensation gluing surface II and one end of the first compensation transceiving surface II, respectively. An included angle between the second compensation cutting surface II and the compensation gluing surface II is 112.5°. An included angle between the second compensation cutting surface II and the second compensation transceiving surface II is 90°. Two ends of the second compensation cutting surface II are intersected with the other end of the compensation gluing surface II and one end of the second compensation transceiving surface II, respectively. The compensation gluing surface II of the compensating prism II is connected to the bottom isosceles surface of the isosceles prism II by means of gluing connection. An included angle between the first compensation transceiving surface II and the isosceles surface I is 90°. The first compensation cutting surface II and the isosceles surface I are in a same plane, and the other end of the compensation gluing surface II, one end of the second compensation cutting surface II and one end of the isosceles cutting surface are intersected on a same straight line.

During measurement, referring to FIG. 10, laser is emitted by the transceiving system II (108) and then received by the transceiving system I (107). In Embodiment 3, an infrared beam emitted from the emitter (103) is incident to the reflecting target (109) on a target object to be measured via the transceiving lens (105). A part of infrared beam reflected by the reflecting target on the target object to be measured is incident into the objective lens. In regard of this part of infrared beam incident into the objective lens, referring to FIG. 7, a part will be propagated along the propagation path of the light beam r3 in the optical beam splitter (200), and then emergent from the isosceles surface II so as to display an optical image on the LCD, a user may thus clearly view the reflecting target on the target object to be measured through the ocular lens; and referring to FIGS. 8 and 9, the other part will be propagated along a reverse propagation path of light beams r4 and r5 in the optical beam splitter (200), then emergent from the first compensation transceiving surface II (B3) of the compensating prism II, and finally received by the receiver (102) after passing through the combined lens (110). According to the round-trip time and light velocity of the infrared beam from a laser rangefinder, a distance from the laser rangefinder to the reflecting target on the target object to be measured may be measured, and the data of the measured distance is displayed on the LCD. The beam splitting system for laser ranging provided by Embodiment 3 has simple and compact structure, convenient use, good stability and high measurement precision.

Figure 7:
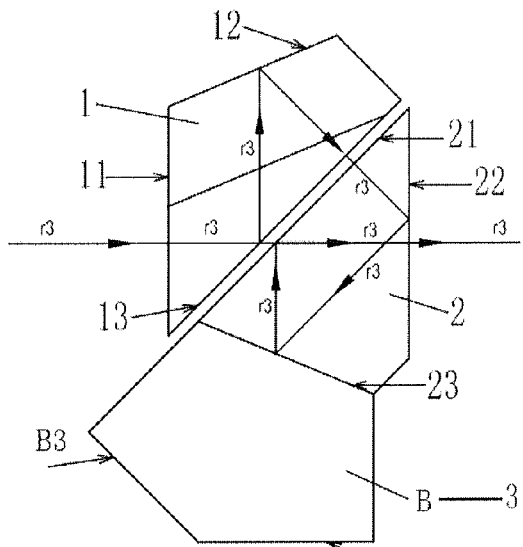
FIG. 7 is a schematic diagram of a light propagation path of a light beam r3 in an optical beam splitter after being incident to the optical beam splitter from a roof transceiving surface of a roof half-pentaprism, when the compensating prism of the optical beam splitter is a compensating prism II according to Embodiment 3 or Embodiment 4 of the present invention.
Figure 8:
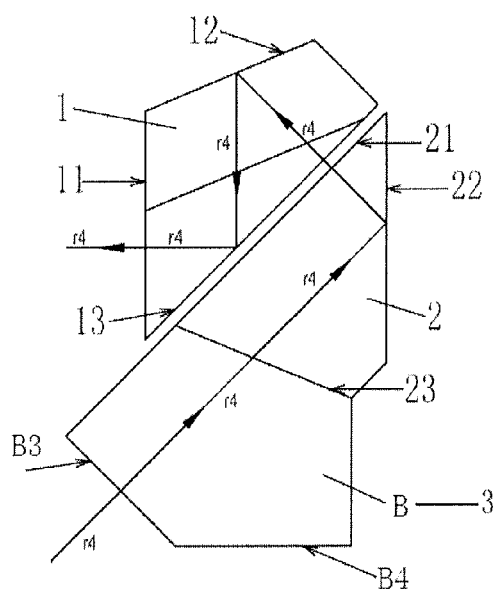
FIG. 8 is a schematic diagram of a light propagation path of a light beam r4 in an optical beam splitter after being incident to the optical beam splitter from a first compensation transceiving surface II of a compensating prism II, when the compensating prism of the optical beam splitter is the compensating prism II according to Embodiment 3 or Embodiment 4 of the present invention.
Figure 9:
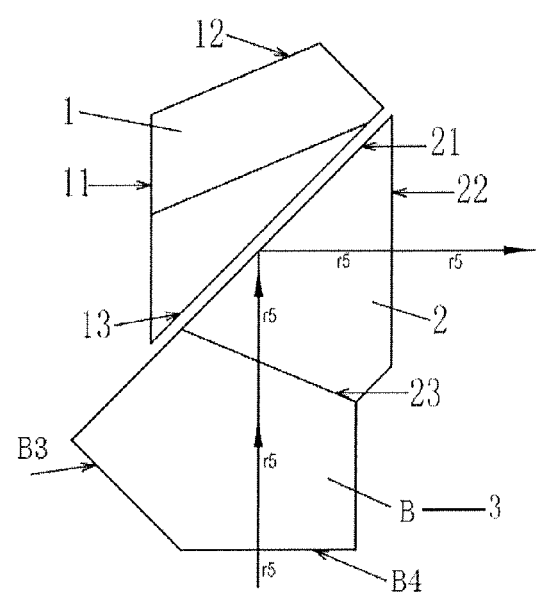
FIG. 9 is a schematic diagram of a light propagation path of a light beam r5 in an optical beam splitter after being incident to the optical beam splitter from a second compensation transceiving surface II of a compensating prism II, when the compensating prism of the optical beam splitter is the compensating prism II according to Embodiment 3 or Embodiment 4 of the present invention.
Figure 11:
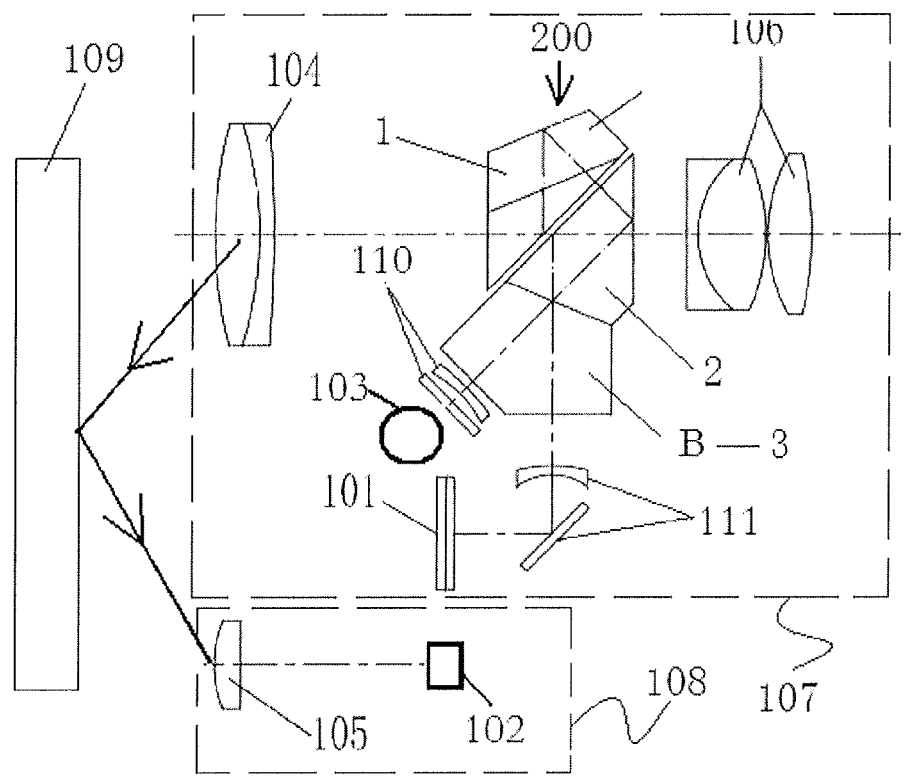
FIG. 11 is a connection structure diagram in a use state of an assembled laser rangefinder where laser is emitted by a transceiving system I and received by a transceiving system II, when the compensating prism of an optical beam splitter is a compensating prism II according to Embodiment 4 of the present invention.

Embodiment 4: Referring to FIG. 11, during installation, the difference between FIG. 11 and FIG. 10 lies in that the receiver (102) in the transceiving system I (107) in FIG. 10 is replaced with an emitter (103), and the emitter (103) in the transceiving system II (108) in FIG. 10 is replaced with a receiver (102). Other structures in FIG. 11 are the same as those of FIG. 10. In Embodiment 4, when in use, laser is emitted by the transceiving system I (107) and then received by the transceiving system II (108). Referring to FIGS. 7, 8 and 9, the propagation direction of the laser beam in Embodiment 4 is opposite to the propagation direction of the laser beam in Embodiment 3. The working principle of Embodiment 4 is the same as the working principle of Embodiment 3. The specific installation and working processes refer to Embodiment 3.

Figure 16:
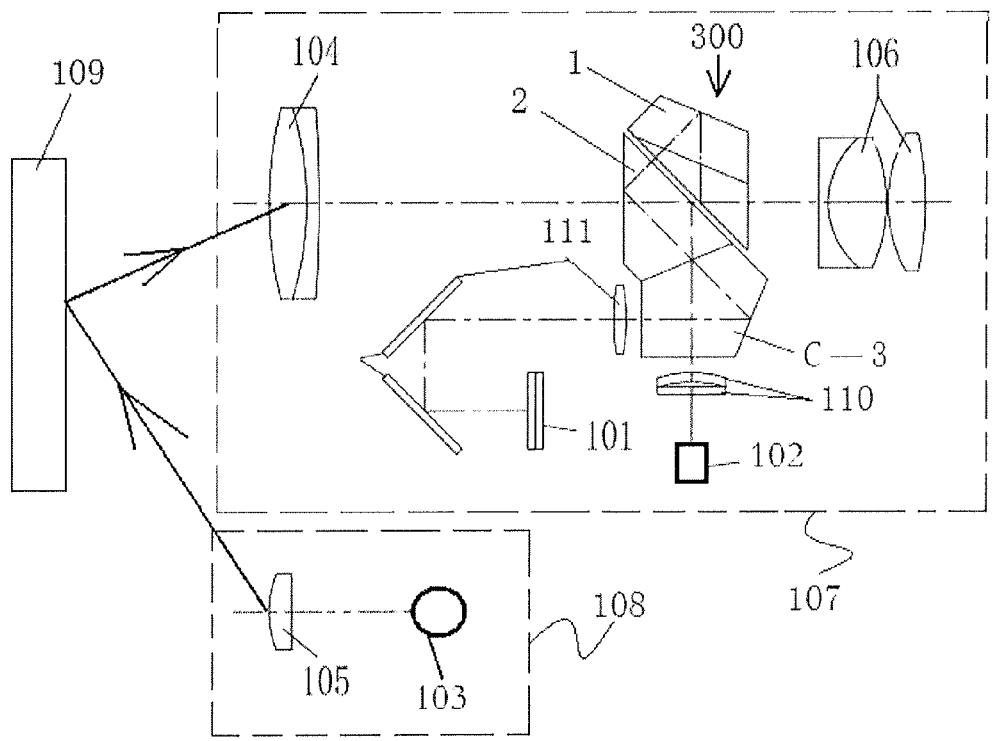
FIG. 16 is a connection structure diagram in a use state of an assembled laser rangefinder where laser is emitted by a transceiving system II and received by a transceiving system I, when the compensating prism of an optical beam splitter is a compensating prism III according to Embodiment 5 of the present invention.

Embodiment 5: Referring to FIG. 16, the difference between FIG. 16 and FIG. 10 lies in that: first, the optical beam splitter (200) in the transceiving system I (107) in FIG. 10 is replaced with an optical beam splitter (300), the compensating prism (3) of the optical beam splitter (300) is a compensating prism III (C), and the compensating prism III includes a first compensation transceiving surface III (C2) and a second compensation transceiving surface III (C3); second, the combined lens (110) and the receiver (102) are disposed on one side opposite to the second compensation transceiving surface III (C3) of the compensating prism III (C), and the combined lens (110) is disposed between the second compensation transceiving surface III (C3) and the receiver (102); and third, a group of combined reflecting lens (111) are disposed on one side opposite to the first compensation transceiving surface III of the compensating prism III (C), and the LCD (101) is disposed in front of the reflecting surfaces of the combined reflecting lens. Other connection structures of FIG. 16 are the same as those of FIG. 10.

Figures 12, 13, 14, 15:
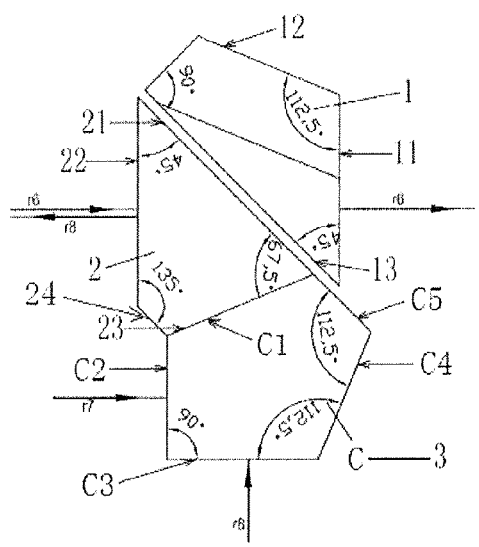
FIG. 12 is a connection structure diagram when the compensating prism of an optical beam splitter is a compensating prism III according to Embodiment 5 or Embodiment 6 of the present invention.
FIG. 13 is a schematic diagram of a light propagation path of a beam r6 in an optical beam splitter after being incident to the optical beam splitter from a roof transceiving surface of a roof half-pentaprism, when the compensating prism of the optical beam splitter is a compensating prism III according to Embodiment 5 or Embodiment 6 of the present invention.
FIG. 14 is a schematic diagram of a light propagation path of a light beam r7 in an optical beam splitter after being incident to the optical beam splitter from a first compensation transceiving surface III of a compensating prism III, when the compensating prism of the optical beam splitter is the compensating prism III according to Embodiment 5 or Embodiment 6 of the present invention.
FIG. 15 is a schematic diagram of a light propagation path of a light beam r8 in an optical beam splitter after being incident to the optical beam splitter from a second compensation transceiving surface III of a compensating prism III, when the compensating prism of the optical beam splitter is the compensating prism III according to Embodiment 5 or Embodiment 6 of the present invention.

Referring to FIG. 12, when the compensating prism (3) is a compensating prism III (C), the section of the compensating prism III is a pentagon. The compensating prism III having a pentagonal section includes a compensation cutting surface III (C5), a first compensation transceiving surface III (C2), a second compensation transceiving surface III (C3), a compensation reflecting surface III (C4) and a compensation gluing surface III (C1). An included angle between the first compensation transceiving surface III and the compensation gluing surface III is 112.5°. An included angle between the first compensation transceiving surface III and the second compensation transceiving surface III is 90°. An included angle between the second compensation transceiving surface III and the compensation reflecting surface III is 112.5°. An included angle between the second compensation transceiving surface III and the compensation gluing surface III is 22.5°. An included angle between the compensation reflecting surface III and the compensation gluing surface III is 45°. An included angle between the compensation cutting surface III and the compensation gluing surface III is 112.5°. An included angle between the compensation cutting surface III and the compensation reflecting surface III is 112.5°. Two ends of the compensation cutting surface III are intersected with one end of the compensation gluing surface III and one end of the compensation reflecting surface III, respectively. The compensation gluing surface III of the compensating prism III is connected to the bottom isosceles surface of the isosceles prism by means of gluing connection. An included angle between the first compensation transceiving surface III and the isosceles surface I is 45°. The compensation cutting surface III and the isosceles surface I are in a same plane, and the other end of the compensation gluing surface III, one end of the first compensation transceiving surface III and one end of the isosceles cutting surface are intersected on a same straight line.

During measurement, referring to FIG. 16, laser is emitted by the transceiving system II (108) and then received by the transceiving system I (107). In Embodiment 5, an infrared beam emitted from the emitter (103) is incident to the reflecting target (109) on a target object to be measured via the transceiving lens (105). A part of infrared beam reflected by the reflecting target on the target object to be measured is incident into the objective lens. In regard of this part of infrared beam incident into the objective lens, referring to FIG. 13, a part will be propagated along the propagation path of the light beam r6 in the optical beam splitter (300), and then emergent from the isosceles surface II so as to display an optical image on the LCD, a user may thus clearly view the reflecting target on the target object to be measured through the ocular lens; and referring to FIGS. 14 and 15, the other part will be propagated along a reverse propagation path of light beams r7 and r8 in the optical beam splitter (300), then emergent from the second compensation transceiving surface III (C2) of the compensating prism III, and finally received by the receiver (102) after passing through the combined lens (110). According to the round-trip time and light velocity of the infrared beam from a laser rangefinder, a distance from the laser rangefinder to the reflecting target on the target object to be measured may be measured, and the data of the measured distance is displayed on the LCD. The beam splitting system for laser ranging provided by Embodiment 5 has simple and compact structure, convenient use, good stability and high measurement precision.

Figure 17:
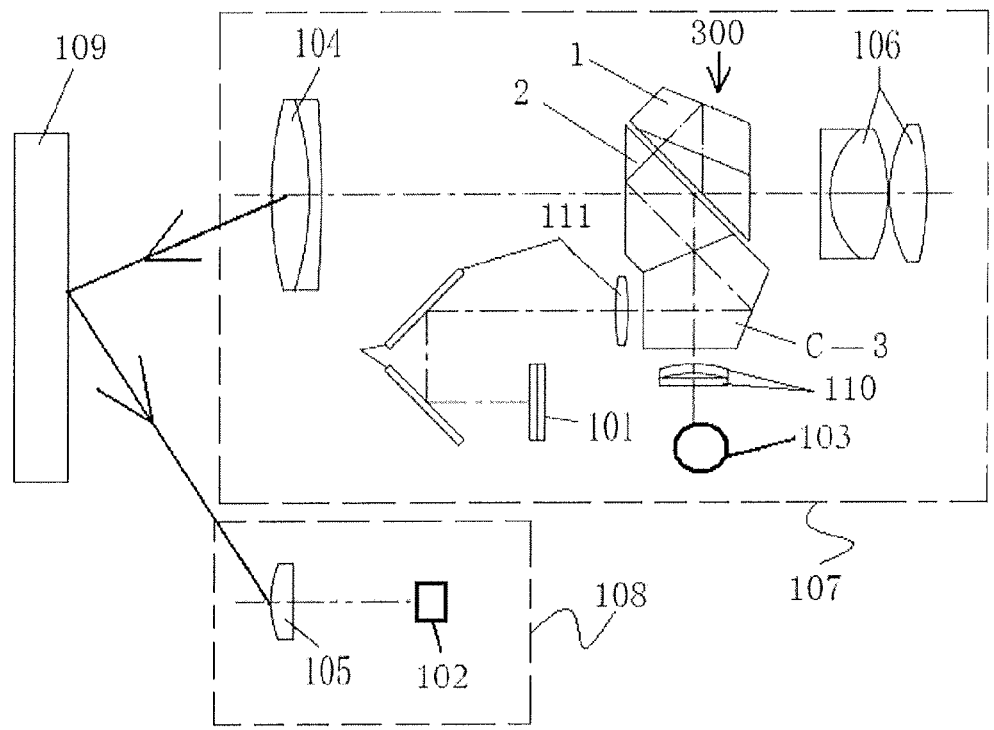
FIG. 17 is a connection structure diagram in a use state of an assembled laser rangefinder where laser is emitted by a transceiving system I and received by a transceiving system II, when the compensating prism of an optical beam splitter is a compensating prism III according to Embodiment 6 of the present invention.

Embodiment 6: Referring to FIG. 17, during installation, the difference between FIG. 17 and FIG. 16 lies in that the receiver (102) in the transceiving system I (107) in FIG. 16 is replaced with an emitter (103), and the emitter (103) in the transceiving system II (108) in FIG. 16 is replaced with a receiver (102). Other structures in FIG. 17 are the same as those of FIG. 16. In Embodiment 6, when in use, laser is emitted by the transceiving system I (107) and then received by the transceiving system II (108). Referring to FIGS. 13, 14 and 15, the propagation direction of the laser beam in Embodiment 6 is opposite to the propagation direction of the laser beam in Embodiment 5. The working principle of Embodiment 6 is the same as the working principle of Embodiment 5. The specific installation and working processes refer to Embodiment 5.

Figure 21:
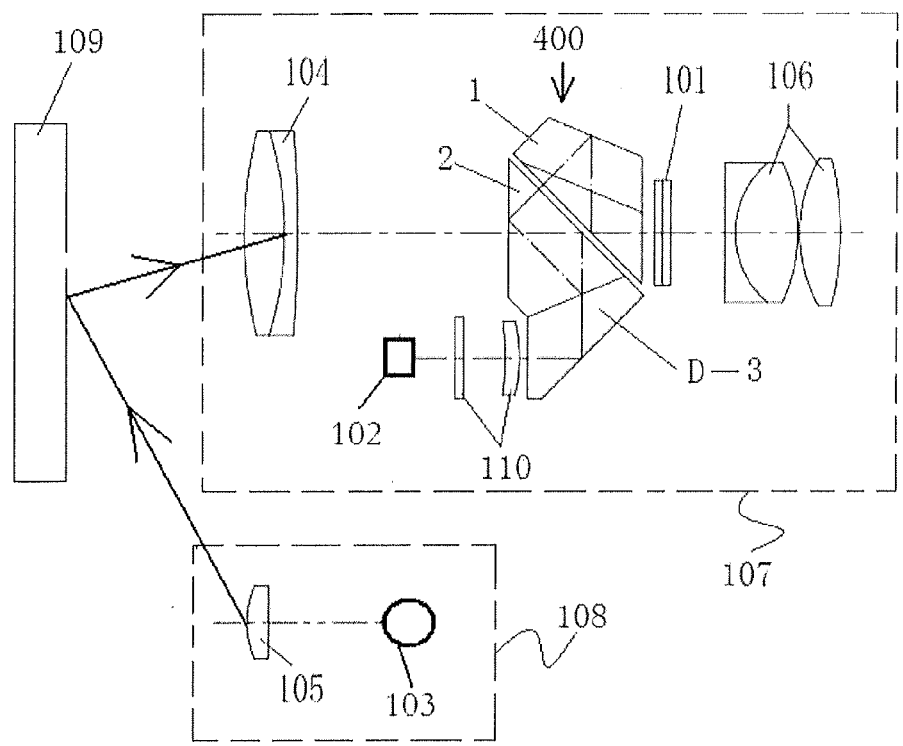
FIG. 21 is a connection structure diagram in a use state of an assembled laser rangefinder where laser is emitted by a transceiving system II and received by a transceiving system I, when the compensating prism of an optical beam splitter is a compensating prism IV according to Embodiment 7 of the present invention.

Embodiment 7: Referring to FIG. 21, the difference between FIG. 21 and FIG. 4 lies in that: first, the optical beam splitter (100) in the transceiving system I (107) in FIG. 4 is replaced with an optical beam splitter (400), the compensating prism (3) of the optical beam splitter (400) is a compensating prism IV (D), and the compensating prism IV includes a compensation transceiving surface IV (D2); and second, the combined lens (110) and the receiver (102) are disposed on one side opposite to the compensation transceiving surface IV of the compensating prism III (D), and the combined lens (110) is disposed between the compensation transceiving surface IV (D2) and the receiver (102). Other connection structures of FIG. 21 are the same as those of FIG. 4.

Figure 18:
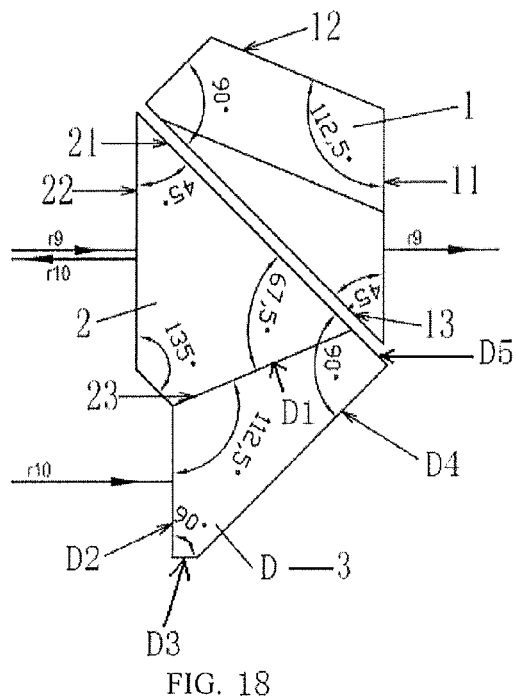
FIG. 18 is a connection structure diagram when the compensating prism of an optical beam splitter is a compensating prism IV according to Embodiment 7 or Embodiment 8 of the present invention.

Referring to FIG. 18, when the compensating prism (3) is a compensating prism IV (D), the section of the compensating prism IV is a pentagon. The compensating prism IV having a pentagonal section includes a first compensation cutting surface IV (D3), a second compensation cutting surface IV (D5), a compensation transceiving surface IV (D2), a compensation reflecting surface IV (D4) and a compensation gluing surface IV (D1). An included angle between the compensation transceiving surface IV and the compensation gluing surface IV is 112.5°. An included angle between the compensation transceiving surface IV and the compensation reflecting surface IV is 45°. An included angle between the compensation reflecting surface IV and the compensation gluing surface IV is 22.5°. An included angle between the first compensation cutting surface IV and the compensation transceiving surface IV is 90°. An included angle between the first compensation cutting surface IV and the compensation reflecting surface IV is 135°. Two ends of the first compensation cutting surface IV are intersected with one end of the compensation transceiving surface IV and one end of the compensation reflecting surface IV, respectively. An included angle between the second compensation cutting surface IV and the compensation gluing surface IV is 112.5°. An included angle between the second compensation cutting surface IV and the compensation reflecting surface IV is 90°. Two ends of the second compensation cutting surface IV are intersected with the other end of the compensation gluing surface II and the other end of the compensation reflecting surface IV, respectively. The compensation gluing surface IV of the compensating prism IV is connected to the bottom isosceles surface of the isosceles prism by means of gluing connection. An included angle between the compensation transceiving surface IV and the isosceles surface I is 45°. The second compensation cutting surface IV and the isosceles surface I are in a same plane, and one end of the compensation gluing surface IV, the other end of the compensation transceiving surface IV and one end of the isosceles cutting surface are intersected on a same straight line.

During measurement, referring to FIG. 21, laser is emitted by the transceiving system II (108) and then received by the transceiving system I (107). In Embodiment 1, an infrared beam emitted from the emitter (103) is incident to the reflecting target (109) on a target object to be measured via the transceiving lens (105). A part of infrared beam reflected by the reflecting target on the target object to be measured is incident into the objective lens. In regard of this part of infrared beam incident into the objective lens, referring to FIG. 19, a part will be propagated along the propagation path of the light beam r9 in the optical beam splitter (400) and then emergent from the isosceles surface II, so as to display an optical image on the LCD, a user may thus clearly view the reflecting target on the target object to be measured through the ocular lens; and referring to FIG. 20, the other part will be propagated along a reverse propagation path of a light beam r10 in the optical beam splitter (400), then emergent from the compensation transceiving surface IV (D2) of the compensation prism IV, and finally received by the receiver (102) after passing through the combined lens (110). According to the round-trip time and light velocity of the infrared beam from a laser rangefinder, a distance from the laser rangefinder to the reflecting target on the target object to be measured may be measured, and the data of the measured distance is displayed on the LCD. The beam splitting system for laser ranging provided by Embodiment 7 has simple and compact structure, convenient use, good stability and high measurement precision.

Figure 19:
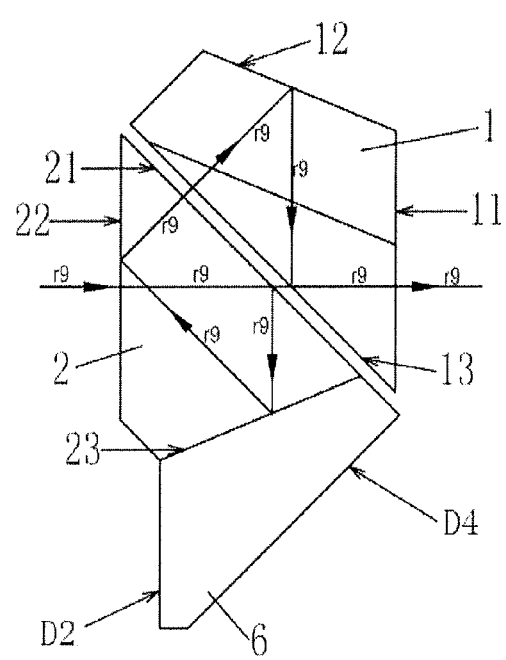
FIG. 19 is a schematic diagram of a light propagation path of a light beam r9 in an optical beam splitter after being incident to the optical beam splitter from a roof transceiving surface of a roof half-pentaprism, when the compensatprism of the optical beam splitter is a compensating prism IV according to Embodiment 7 or Embodiment 8 of the present invention.
Figure 20:
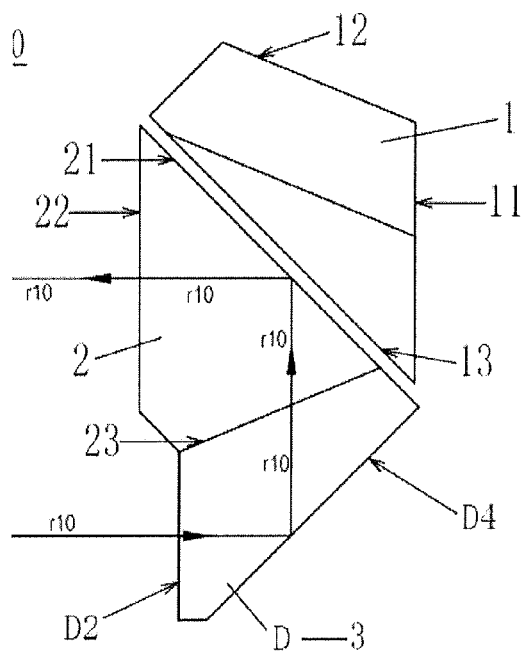
FIG. 20 is a schematic diagram of a light propagation path of a light beam r10 in an optical beam splitter after being incident to the optical beam splitter from a compensation transceiving surface IV of a compensating prism IV, when the compensating prism of the optical beam splitter is the compensating prism IV according to Embodiment 7 or Embodiment 8 of the present invention.
Figure 22:
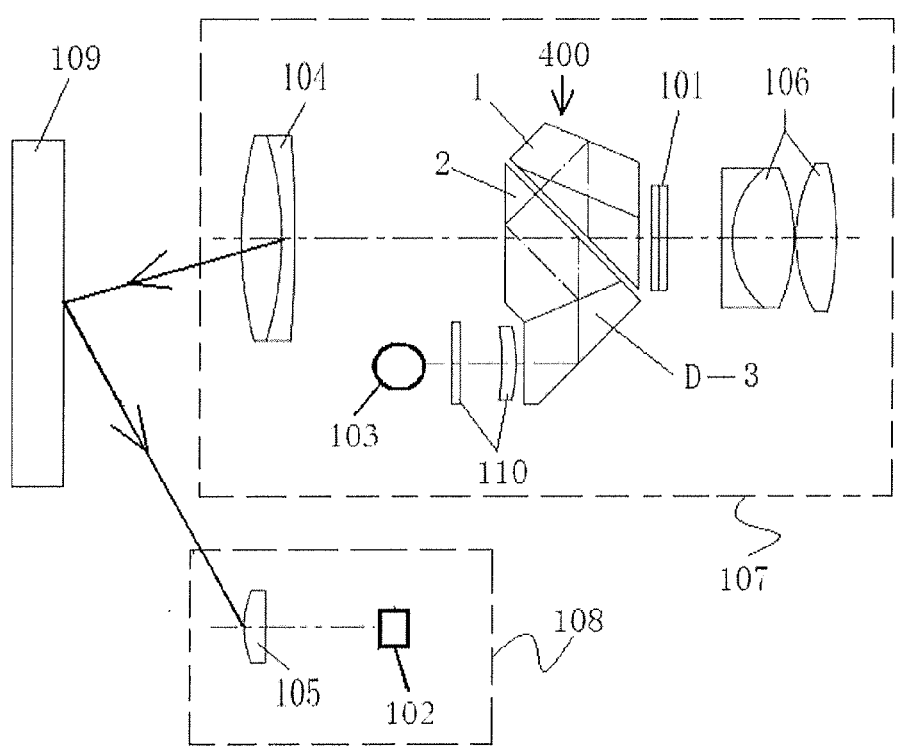
FIG. 22 is a connection structure diagram in a use state of an assembled laser rangefinder where laser is emitted by a transceiving system I and received by a transceiving system II, when the compensating prism of an optical beam splitter is a compensating prism IV according to Embodiment 6 of the present invention.

Embodiment 8: Referring to FIG. 22, during installation, the difference between FIG. 22 and FIG. 21 lies in that the receiver (102) in the transceiving system I (107) in FIG. 21 is replaced with an emitter (103), and the emitter (103) in the transceiving system II (108) in FIG. 21 is replaced with a receiver (102). Other structures in FIG. 22 are the same as those of FIG. 21. In Embodiment 8, when in use, laser is emitted by the transceiving system I (107) and then received by the transceiving system II (108). Referring to FIGS. 19 and 20, the propagation direction of the laser beam in Embodiment 8 is opposite to the propagation direction of the laser beam in Embodiment 7. The working principle of Embodiment 8 is the same as the working principle of Embodiment 7. The specific installation and working processes refer to Embodiment 7.

The embodiments of the present invention have been described above with reference to the drawings. However, the present invention is not limited thereto when in implementation. A person of ordinary skill in the art may make various changes or modifications within the scope defined by the appended claims.

The invention claimed is:
1. A beam splitting system for laser ranging, comprising a roof half-pentaprism (1), an isosceles prism (2) and a compensating prism (3),
   the roof half-pentaprism comprises a roof transceiving surface (11), an outer roof reflecting surface (12), an inner roof reflecting surface (13) and a top roof surface (14), two ends of the roof transceiving surface being intersected with one end of the outer roof reflecting surface and one end of the inner roof reflecting surface, respectively, two ends of the top roof surface being intersected with the other end of the outer roof reflecting surface and the other end of the inner roof reflecting surface, respectively, an included angle between the outer roof reflecting surface and the roof transceiving surface being 112.5°, an included angle between the roof transceiving surface and the inner roof reflecting surface being 45°an included angle between the inner roof reflecting surface and the top roof surface being 90°;
   two isosceles surfaces of the isosceles prism are an isosceles surface I (21) and an isosceles surface II (22), respectively, the bottom surface of the isosceles prism being a bottom isosceles surface (23), an included angle between the isosceles surface I and the isosceles surface II being 45°;
   the isosceles surface I of the isosceles prism is parallel to the inner roof reflecting surface of the roof half-pentaprism, and a space between the isosceles surface I and the inner roof reflecting surface is 0.8-1 mm;
   the compensating prism (3) is a compensating prism I (A), a compensating prism II (B), a compensating prism III (C) or a compensating prism IV (D);
   (I) when the compensating prism (3) is a compensating prism I (A), the compensating prism I comprises a compensation transceiving surface I (A2) and a compensation gluing surface I (A1), an included angle between the compensation transceiving surface I and the compensation gluing surface I being 22.5°, the compensation gluing surface I of the compensating prism I being connected to the bottom isosceles surface of the isosceles prism by means of gluing connection, an included angle between the compensation transceiving surface I and the isosceles surface I being 90°;
   (II) when the compensating prism (3) is a compensating prism II (B), the compensating prism II comprises a first compensation transceiving surface II (B3), a second compensation transceiving surface II (B4) and a compensation gluing surface II (B1), an included angle between the first compensation transceiving surface II and the compensation gluing surface II being 22.5°, an included angle between the second compensation transceiving surface II and the compensation gluing surface II being 22.5°, an included angle between the first compensation transceiving surface II and the second compensation transceiving surface II being 135°, the compensation gluing surface II of the compensating prism II being connected to the bottom isosceles surface of the isosceles prism by means of gluing connec- tion, an included angle between the first compensation transceiving surface II and the isosceles surface I being 90°;

(III) when the compensating prism (3) is a compensating prism III (C), the compensating prism III comprises a first compensation transceiving surface III (C2), a second compensation transceiving surface III (C3), a compensation reflecting surface III (C4) and a compensation gluing surface III (C1), an included angle between the first compensation transceiving surface III and the compensation gluing surface III being 112.5°, an included angle between the first compensation transceiving surface III and the second compensation transceiving surface III being 90°, an included angle between the second compensation transceiving surface III and the compensation reflecting surface III being 112.5°, an included angle between the second compensation transceiving surface III and the compensation gluing surface III being 22.5°, an included angle between the compensation reflecting surface III and the compensation gluing surface III being 45°, the compensation gluing surface III of the compensating prism III being connected to the bottom isosceles surface of the isosceles prism by means of gluing connection, an included angle between the first compensation transceiving surface III and the isosceles surface I being 45°; and (IV) when the compensating prism (3) is a compensating prism IV (D), the compensating prism IV comprises a compensation transceiving surface IV (D2), a compensation reflecting surface IV (D4) and a compensation gluing surface IV (D1), an included angle between the compensation transceiving surface IV and the compensation gluing surface IV being 112.5°, an included angle between the compensation transceiving surface IV and the compensation reflecting surface IV being 45°, an included angle between the compensation reflecting surface IV and the compensation gluing surface IV being 22.5°, the compensation gluing surface IV of the compensating prism IV being connected to the bottom isosceles surface of the isosceles prism by means of gluing connection, an included angle between the compensation transceiving surface IV and the isosceles surface I being 45°.

2. The beam splitting system for laser ranging according to claim 1, characterized in that an isosceles cutting surface (24) is provided on the isosceles prism, two ends of the isosceles cutting surface being intersected with one end of the isosceles surface II and one end of the bottom isosceles surface, respectively, an included angle between the isosceles surface II and the isosceles cutting surface being 135°.

3. The beam splitting system for laser ranging according to claim 2, characterized in that the section of the compensating prism I is a triangle, and the compensating prism I having a triangular section comprises a compensation cutting surface I (A3), an included angle between the compensation transceiving surface I and the compensation cutting surface I being 90°.

4. The beam splitting system for laser ranging according to claim 2, characterized in that the section of the compensating prism II is a pentagon, the compensating prism II having a pentagonal section comp rising a first compensation cutting surface II (B2) and a second compensation cutting surface II (B5), an included angle between the first compensation cutting surface II and the compensation gluing surface II being 112.5°, an included angle between the first compensation cutting surface II and the first compensation transceiving surface II being 90°, two ends of the first compensation cutting surface II being intersected with one end of the compensation gluing surface II and one end of the first compensation transceiving surface II, respectively, an included angle between the second compensation cutting surface II and the compensation gluing surface II being 112.5°, an included angle between the second compensation cutting surface II and the second compensation transceiving surface II being 90°, two ends of the second compensation cutting surface II being intersected with the other end of the compensation gluing surface II and one end of the second compensation transceiving surface II, respectively.

5. The beam splitting system for laser ranging according to claim 2, characterized in that the section of the compensating prism III is a pentagon, the compensating prism III having a pentagonal section comprising a compensation cutting surface III (C2), an included angle between the compensation cutting surface III and the compensation gluing surface III being 112.5°, an included angle between the compensation cutting surface III and the compensation reflecting surface III being 112.5°, two ends of the compensation cutting surface III being intersected with one end of the compensation gluing surface III and one end of the compensation reflecting surface III, respectively.

6. The beam splitting system for laser ranging according to claim 2, characterized in that the section of the compensating prism IV is a pentagon, the compensating prism IV having a pentagonal section comprising a first compensation cutting surface IV (D3) and a second compensation cutting surface IV (D5), an included angle between the first compensation cutting surface IV and the compensation transceiving surface IV being 90°, an included angle between the first compensation cutting surface IV and the compensation reflecting surface IV being 135°, two ends of the first compensation cutting surface IV being intersected with one end of the compensation transceiving surface IV and one end of the compensation reflecting surface IV, respectively, an included angle between the second compensation cutting surface IV and the compensation gluing surface IV being 112.5°, an included angle between the second compensation cutting surface IV and the compensation reflecting surface IV being 90°, two ends of the second compensation cutting surface IV being intersected with the other end of the compensation gluing surface II and the other end of the compensation reflecting surface IV, respectively.

7. The beam splitting system for laser ranging according to claim 3, characterized in that the compensation cutting surface I and the isosceles cutting surface are in a same plane, and one end of the compensation transceiving surface I, one end of the compensation gluing surface I and one end of the isosceles surface I are intersected on a same straight line.

8. The beam splitting system for laser ranging according to claim 4, characterized in that the first compensation cutting surface II and the isosceles surface I are in a same plane, and the other end of the compensation gluing surface II, one end of the second compensation cutting surface II and one end of the isosceles cutting surface are intersected on a same straight line.

9. The beam splitting system for laser ranging according to claim 5, characterized in that the compensation cutting surface III and the isosceles surface I are in a same plane, and the other end of the compensation gluing surface III, one end of the first compensation transceiving surface III and one end of the isosceles cutting surface are intersected on a same straight line.

10. The beam splitting system for laser ranging according to claim 6, characterized in that the second compensation cutting surface IV and the isosceles surface I are in a same plane, and one end of the compensation gluing surface IV, the other end of the compensation transceiving surface IV and one end of the isosceles cutting surface are intersected on a same straight line.

\* \* \* \* \*